Jan. 14, 1941.  G. MERTA  2,228,773

INTERMITTENT MOTION

Filed Sept. 16, 1939   3 Sheets-Sheet 1

Inventor
GEORGE MERTA
Lyon & Lyon
Attorneys

Jan. 14, 1941.　　　　　G. MERTA　　　　　2,228,773

INTERMITTENT MOTION

Filed Sept. 16, 1939　　　　　3 Sheets-Sheet 2

Inventor
GEORGE MERTA

By Lyon & Lyon
Attorneys

Jan. 14, 1941.  G. MERTA  2,228,773
INTERMITTENT MOTION
Filed Sept. 16, 1939  3 Sheets-Sheet 3
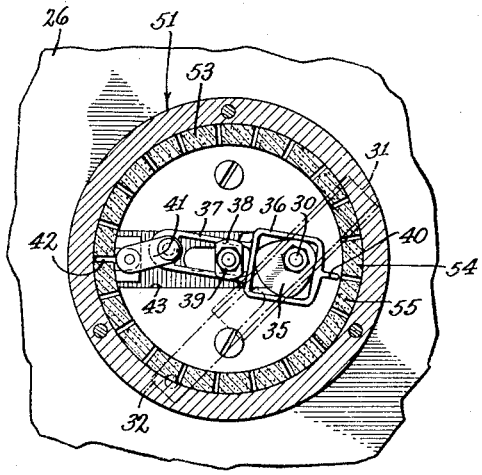
Fig. 10.
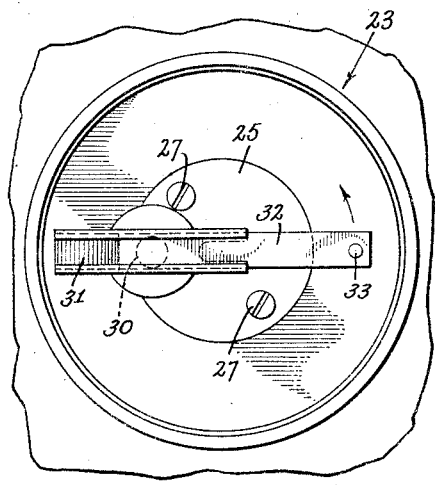
Fig. 5.
Fig. 6.
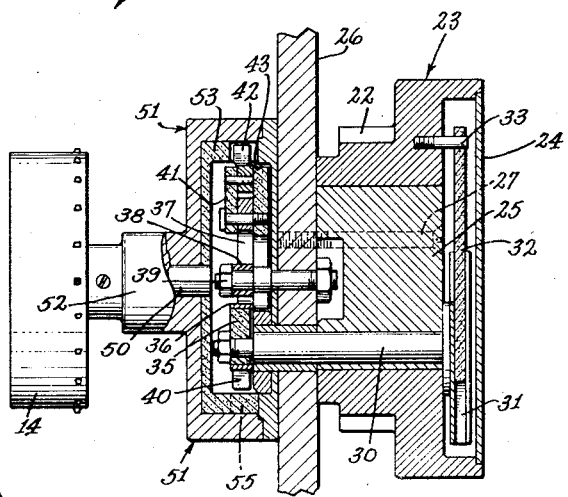
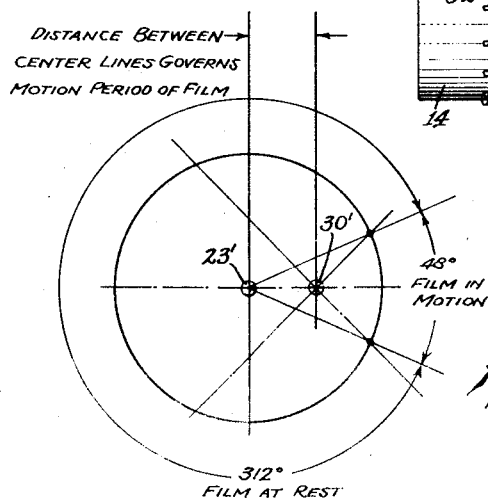
Fig. 11.
Inventor
GEORGE MERTA
By
Attorneys Patented Jan. 14, 1941

2,228,773

UNITED STATES PATENT OFFICE 2,228,773

INTERMITTENT MOTION

George Merta, Los Angeles, Calif.

Application September 16, 1939, Serial No. 295,258

4 Claims. (Cl. 74—125)

This invention pertains to devices whereby continuous rotation is translated into an intermittent movement or predetermined periodic partial rotation. Although the devices of this invention may be used for various purposes, they are particularly well adapted for use in motion picture cameras and projectors where the continuous strip of film must be very rapidly advanced and then caused to remain stationary, these periods of movement and rest coming in rapid succession. The apparatus of this invention is particularly well adapted for use in motion picture cameras and projectors since the apparatus is capable of causing the period of film movement to be but a very small fraction of the period during which the film is at rest, in any given cycle. As a result, the time during which the film may be exposed is relatively long whereas the period of time during which the film is moving into a new position is very short. Exposure periods and projection periods, therefore, permit the film to be used most effectively.

Forms of intermittent movement have been used in cameras and projectors in the past but previous forms of such movements were noisy, complicated and not sufficiently positive. During projection or photography the film must be perfectly still. Noisy devices are unsatisfactory since motion picture photography is now ordinarily accompanied by sound recording. The complicated nature of prior intermittent movements renders them too expensive for use in any but the large professional machines. The present invention, however, relates to a simple, inexpensive form of movement which is particularly well suited for use in amateur cameras and projectors. In addition, its freedom from noise and the positive nature of the drive renders the device free from many objections found in existing intermittent movements, even on professional machines.

Generally stated, the apparatus comprises a continuously, uniformly driven member which then actuates a slotted pitman, the pitman cooperating with a crown wheel mounted upon a shaft, the pitman positively driving the crown wheel and its associated shaft to impart a periodic partial rotation thereto, said pitman also engaging the crown wheel for the purpose of locking the same in position at the end of each period of intermittent movement.

An object of the invention, therefore, is to provide a combination of elements whereby continuous rotation may be readily translated into an intermittent periodic partial rotation.

Another object is to disclose and provide a mechanism particularly adapted for the intermittent movement of continuous strips of motion picture film.

A further object is to disclose and provide a combination of elements whereby continuous rotary motion is translated into a periodic partial rotation in a ready and facile manner.

These and other objects, uses and advantages of the invention will become apparent to those skilled in the art from the following detailed description, particular reference being made hereafter to an exemplary form of the invention adapted for use in motion picture projectors, although it is to be understood that the mechanism may be employed for various other purposes.

In the following description, reference will be had to the appended drawings wherein—

Fig. 5 is a rear view of the device shown in Fig. 2.

Fig. 6 is a section taken along the plane 6—6 of Fig. 4.

Figs. 7, 8, 9 and 10 are side views in section, showing various positions of the driving elements.

Fig. 11 is a graphical representation of the cycle of operations, particularly illustrating the relative periods of dwell and partial rotation during one complete rotational cycle of the driving means.

Figure 1:
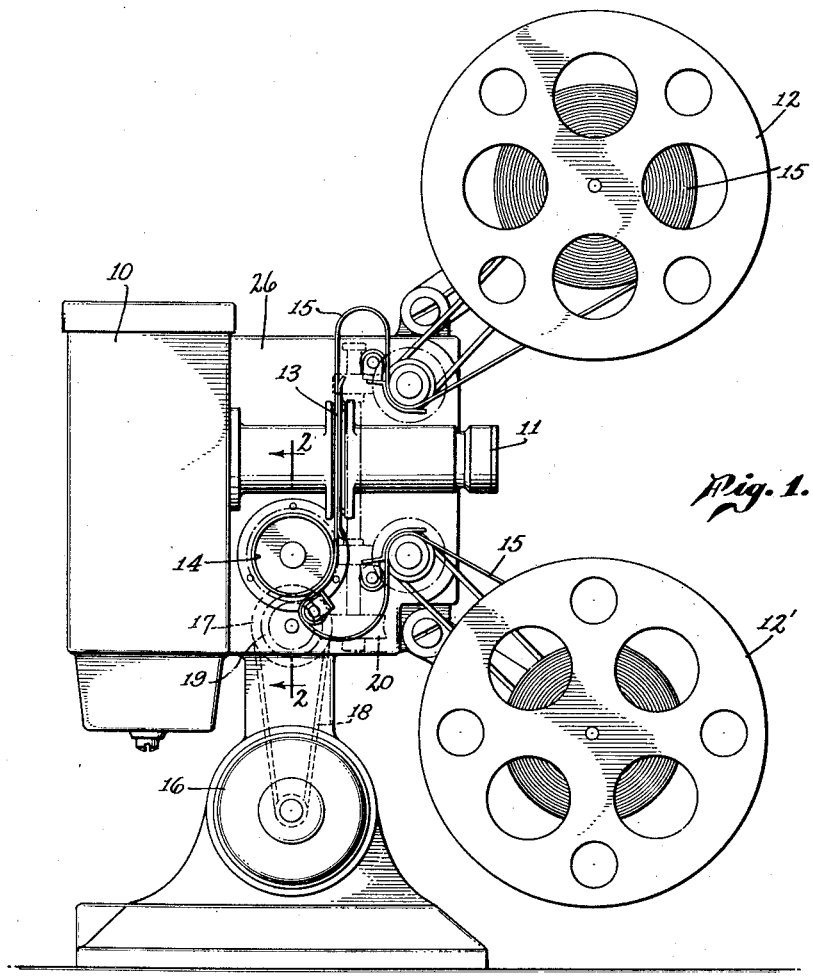
Fig. 1 is a side elevation of a motion picture projector embodying the intermittent movement of this invention.
Figure 3:
Fig. 3 illustrates a strip of motion picture film of the 16 millimeter size.

The typical projector shown in Fig. 1 comprises a light housing 10, a projection lens 11, film reels 12 and 12', a film gate 13, and an intermittently driven sprocket wheel 14 which engages the perforations of the film 15 and moves the film intermittently through the gate 13. The film 15 illustrated in Fig. 3 is of the type known as 16 millimeter but it is to be understood that 8 millimeter, 35 millimeter and other strip film may be moved intermittently by an apparatus such as is described in Fig. 1.

Figure 2:
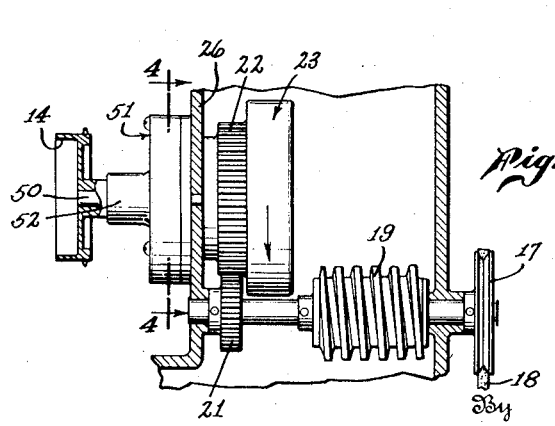
Fig. 2 is an enlarged view, partly in section, taken along the plane 2—2 of Fig. 1.

By referring to Figs. 1 and 2, it will be noted that a motor 16 drives a pulley 17 by means of a belt 18, the shaft on which pulley 17 is mounted also carrying a worm 19 which engages a spiral gear 20, the spiral gear rotating a shaft which operates drives for the two reels 12 and 12' and if desired also drives a shutter (not shown). The same driven shaft on which the pulley 17 and the worm 19 are mounted may also carry a spur gear 21 which engages the gear 22 mounted or formed integral with a driven member 23. The continuous rotation of the driven member 23 is then translated into an intermittent partial rotation of the sprocket wheel 14 by means which are best understood by a consideration of Fig. 4, Fig. 5 and Fig. 6.

As most clearly shown in Fig. 6, a fixed center bearing 25 is firmly attached to the wall or partition 26 as, for example, by means of the screws 27 and the continuously driven member 23 is journaled on this bearing. The center bearing is provided with an eccentrically disposed bore in which jack shaft 30 is journaled. This jack shaft is provided with a transversely extending channel or guide 31 adapted to slidably receive an actuating arm 32 pivotally connected as at 33 to the continuously driven member 23.

Rotation of the member 23 will therefore cause a rotation of the jack shaft 30. In the event the member 23 is driven at a uniform speed, the jack shaft 30 will rotate at the same speed or will revolve the same number of times per minute but the rate of rotation of the jack shaft 30 will vary during the cycle because of the eccentric disposition of the axis of the jack shaft 30 with respect to the axis of the fixed center bearing 25.

The other end of the jack shaft 30 is provided with a triangular cam 35 which is eccentrically disposed with respect to the jack shaft 30. The triangular cam 35 is slidably received within a yoke 36 carried by a slotted pitman 37, the pitman being slidably held by means of a retainer 38 and the bolt 39, the bolt being fastened onto the fixed wall 26. An engaging member or driving pin 40 is carried by the pitman 37 adjacent the yoke or cage 36. The other end of the pitman is connected by means of a link 41 to a registering pin 42 extending from a block slidable in transverse guides 43.

An intermittently driven shaft 50 journaled in a housing 51 provided with a boss 52 carries a crown wheel or toothed disc 53 provided with an upstanding edge portion having a plurality of teeth, such as the teeth 54 and 55, separated by slots or openings. The intermittently driven shaft 50 has removably attached thereto the sprocket wheel 14. As shown in Fig. 6 the sprocket wheel has but one series of sprocket teeth adapted to fit into the perforations of strip film so that the sprocket 14 may be used for driving 8 millimeter film which is provided with perforations along one longitudinal edge only. 16 millimeter film can, however, be also intermittently advanced by the same sprocket. The teeth on the intermittent sprocket 14 may, of course, vary both in size, location and number with the perforations in the strip film which is to be advanced.

Figure 4:
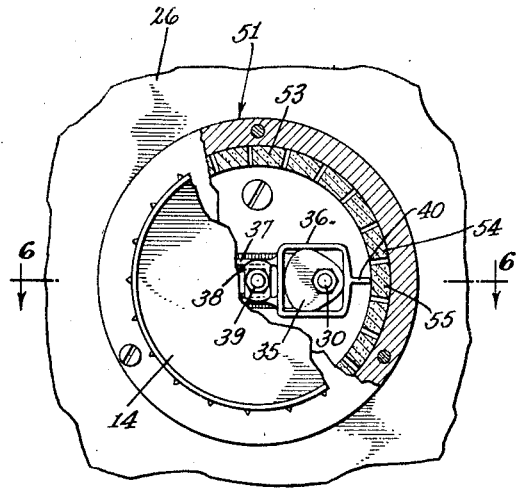
Fig. 4 is an enlarged side view, partly broken away, showing the intermittently driven sprocket wheel and associated driving elements, the view being taken in the direction of the arrows 4—4 indicated on Fig. 2.

Figs. 4, 5 and 6 show the device in an intermediate position with the driving pin 40 disengaged from the teeth of the crown wheel 53. The registry pin 42 is in engagement with the teeth on the opposite side and since the registry pin 42 fits with a sliding fit between the teeth, the crown wheel 53, its associated shaft 50 and the intermittent sprocket 14 remain stationary and immovable.

Attention is called to the fact that the bolt 39 is preferably in axial alignment with the intermittently driven shaft 50 and that the guides 43 in which the block carrying the registry pin 42 slides extend transversely and diametrically with respect to the periphery of the crown wheel 53. It will also be noted that the registry pin 42, therefore, is capable of reciprocating motion diametrically of the crown wheel 53.

When the continuously driven member 23 rotates in the direction of the arrow, indicated in Fig. 2, the crown wheel will, as shown, rotate in the same direction. By comparing Figs. 4, 7, 8, 9 and 10, a complete cycle of operations will be observed.

Figure 7:
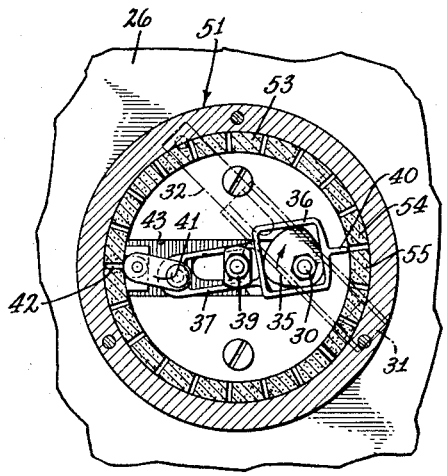
Figure 8:
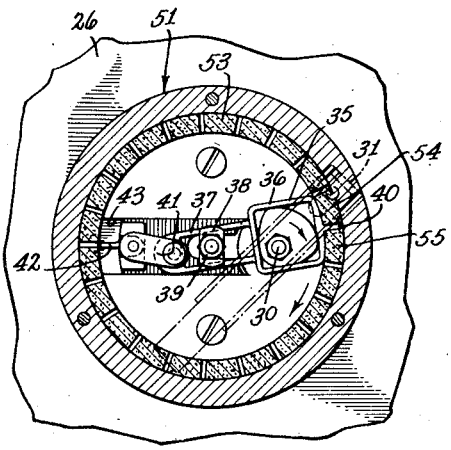

From the neutral position indicated in Fig. 4, rotation of the jack shaft 30 will cause the cam 35 to move the pitman 37 upwardly into the position shown in Fig. 7. It is to be noted that in this position the driving pin 40 is now in alignment with one of the openings in the crown wheel between the teeth 54 and 55. Further rotation of the jack shaft moves the pitman 37 in a radial direction with respect to the crown wheel 53 so as to force the driving pin 40 into the opening between the teeth 54 and 55 and into the position indicated in Fig. 8. Such driving engagement occurs simultaneously with the withdrawal of the registry pin 42 from engagement with the crown wheel.

Figure 9:
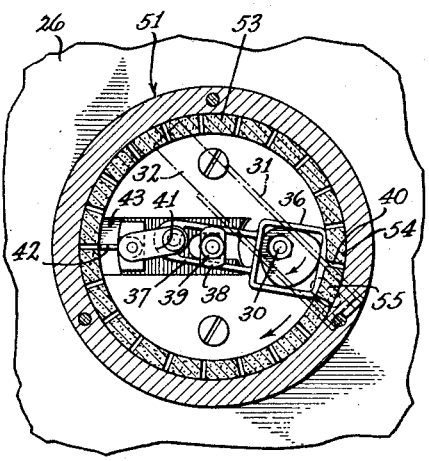

Further rotation of the jack shaft and triangular cam 35 associated therewith rapidly moves the cage or yoke 36 downwardly into the position indiciated in Fig. 9. It is to be noted that this rapid downward motion of the driving pin 40 carried by the pitman 37 takes place while the jack shaft revolves partially. Further turning of the jack shaft 30, from the position indicated in Fig. 9 to that indicated in Fig. 10, causes the driving pin 40 to be withdrawn and at the same time causes the registry pin 42 to engage with another slot in the crown wheel 53. In Fig. 10 it is to be noted that the registry pin 42 is now in engagement with the crown wheel but the driving pin 40 is clear when the jack shaft 30 revolves a little. Further, it again assumes the position shown in Fig. 4 and thereafter assumes the position shown in Fig. 7, the registry pin maintaining its engagement with the crown wheel 53 during all stages in the cycle shown in Figs. 10, 4 and 7.

By referring to Fig. 11, it will be seen that the distance between the axial centers of the jack shaft and the continuously driven member 23 determines the motion period of the sprocket 14. The axial center of the member 23 is, for example, illustrated at 23' in Fig. 11 whereas the actual center of the jack shaft 30 is indicated at 30'. During 312° of revolution of the driving member 23, the sprocket 14 is stationary and the film is at rest but during the remaining 48° of rotation the intermittent sprocket 14 is moved a predetermined distance and then firmly anchored or registered again. It is also to be noted that the jack shaft 30 and the cam 35 rotate at a higher peripheral speed during that period of time when the driving pin 40 is actually driving the crown wheel 53 than at other periods during the cycle of revolution of the jack shaft 30. For this reason a rapid predetermined movement is imparted to the film and during a very large proportion of the total cycle the film remains stationary.

The housing 51 may be attached in any suitable manner to the stationary portion of the device or to the partition 26 and the pitman cam and entire interior embraced by the crown wheel 53 may be packed in oil, thereby dampening vibration and causing all of the moving parts to operate in an airtight bath of oil. Similarly, the continuously driven member 23 may be provided with a closure 24 so as to permit the actuating arm, guide, etc., to also operate in an oil bath.

In addition, attention is called to the fact that the moving elements are all light and have but small displacement so that the amount of inertia and mass in motion is reduced to a minimum.

In Fig. 4, and Figs. 7 to 10 inclusive, the block that forms the rear end of the locking pin 42, is represented as having considerable clearance between the guides 43. This is to enable the drawings to be read more clearly, but it should be understood that in practice, this block should be fitted quite accurately in its guides so as to insure that the pin 42 will always be properly aligned to enter the socket between two adjacent teeth 53 of the crown wheel.

I claim:

1. In an apparatus for translating continuous rotation into partial intermittent rotation, the combination of: a rotatable jack shaft and means for translating rotation of such jack shaft into a periodic intermittent partial rotation of a driven shaft, comprising a slotted pitman provided with a cam yoke and a driving pin at the free end thereof, a fixed pin cooperating with the slot in said pitman, a cam carried by the jack shaft and slidably retained in said cam yoke, a driven shaft provided with a crown wheel adapted to be periodically engaged by said driving pin of said pitman, a reciprocating locking pin, means for guiding the same to move to and fro along its own axis, a link connecting the said locking pin to the adjacent end of the slotted pitman for actuating the pin by said pitman, said locking pin adapted to engage with and lock said crown wheel when said crown wheel is not being driven by said driving pin.

2. In an apparatus for translating continuous rotation into partial intermittent rotation, the combination of: a rotatable jack shaft, means for rotating said jack shaft, a driven shaft provided with a crown wheel, a slotted pitman provided with a cam yoke, and a driving pin at the free end thereof; a reciprocating locking pin slidably mounted in fixed guide means, links connecting said locking pin with the end of said slotted pitman opposite the driving pin, a fixed pivot pin extending through the slot in said pitman, a triangular cam carried by the jack shaft and slidably retained in said cam yoke whereby rotation of said jack shaft and triangular cam causes the driving pin to engage with and drive said crown wheel and then disengage such driving pin while engaging the locking pin with the crown wheel.

3. In an apparatus for translating continuous rotation into partial intermittent rotation, the combination of: a rotatable jack shaft, means for rotating said jack shaft, a driven shaft provided with a crown wheel, a slotted pitman provided with a cam yoke, and a driving pin at the free end thereof; a reciprocating locking pin slidably mounted in fixed guide means, links connecting said locking pin with the end of said slotted pitman opposite the driving pin, a fixed pivot pin extending through the slot in said pitman, a triangular cam carried by the jack shaft and slidably retained in said cam yoke whereby rotation of said jack shaft and triangular cam causes the driving pin to engage with and drive said crown wheel and then disengage such driving pin while engaging the locking pin with the crown wheel, the axis of said intermittently driven shaft being parallel to but eccentric with respect to said jack shaft.

4. In an apparatus for translating continuous and uniform rotation into partial intermittent rotation, the combination of: a guide plate, a jack shaft, a triangular cam carried by the end of said jack shaft, an intermittently driven shaft carrying a crown wheel, the axis of said intermittently driven shaft being parallel to but eccentric with respect to said jack shaft, a slotted pitman provided with a cam yoke adapted to receive the triangular cam, a driving pin carried by the pitman adjacent the yoke, a reciprocating locking pin, guided to slide on said guide plates, links connecting said locking pin with the end of said slotted pitman opposite the driving pin end, said locking and driving pins being adapted to alternately enter between teeth of said crown wheel.

GEORGE MERTA.